Dec. 18, 1923. 1,477,776
R. SHEDENHELM
CONVEYER DEVICE
Filed Sept. 27, 1921 2 Sheets-Sheet 2
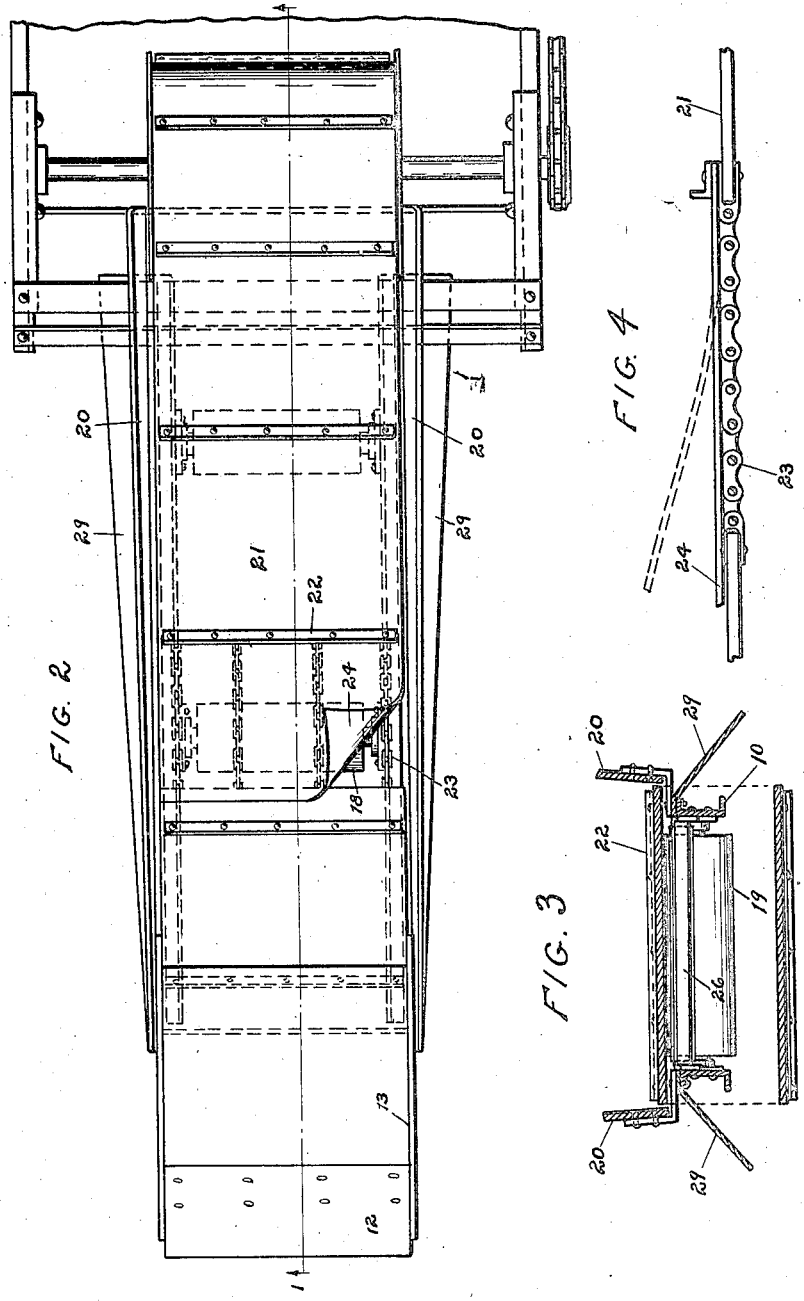
INVENTOR
Robert Shedenhelm
Irving & Hague ATTYS.

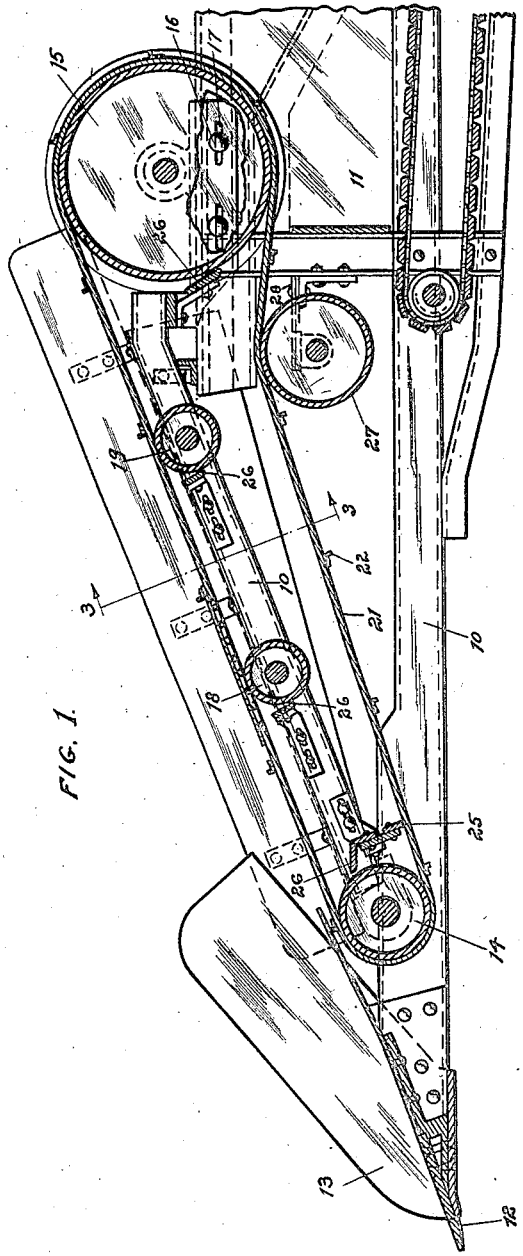

Patented Dec. 18, 1923.

1,477,776

UNITED STATES PATENT OFFICE.

ROBERT SHEDENHELM, OF GRINNELL, IOWA.

CONVEYER DEVICE.

Application filed September 27, 1921. Serial No. 503,644.

*To all whom it may concern:*

Be it known that I, ROBERT SHEDENHELM, a citizen of the United States, and resident of Grinnell, in the county or Poweshiek and State of Iowa, have invented a certain new and useful Conveyer Device, of which the following is a specification.

My improved conveyer is especially designed for use in connection with material digging, loading and conveying devices such for instance as that illustrated in my application Letters Patent on manure loader, and spreader, filed October 16th, 1917, Serial Number 196,952. In machines of this class when in use the lower end of the conveyer receives material such as earth, in wet or dry condition, manure, and the like from the cutting blade in the front as the machine is advanced. Then the material is carried by the conveyer and discharged into the wagon box into which the rear end of conveyer is extended. Heretofore considerable difficulty in maintaining such conveyer in operative condition has been experienced because it sometimes happened that the material being carried upwardly would drop off of the edges of the conveyer and enter between the upper and lower portions of the conveyer and also the material that was piled within the wagon box would enter between the rear upper roller and the lower portion of the conveyer and this material would sometimes adhere to the rollers and sometimes to the inner surface of the conveyer belt and soon render the device inoperative.

My object is to provide a conveyer for such purposes, of simple, durable, and inexpensive construction and so arranged and constructed that only in unusual or exceptional instances can any material enter between the upper and lower layers of the conveyer belt and if any material does thus enter it will be readily and quickly removed, either from the belt or from the rollers before any injury to the conveyer mechanism can take place.

A further object is to provide a conveyer of this class, in which the material being conveyed will scour the stationary side boards of the conveyer to prevent the accumulation of material thereon, and at the same time the binding or retarding effect of such scouring will be reduced to a minimum.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a vertical, central, sectional view of the conveyer embodying my invention.

Figure 2 shows a top or plan view of same.

Figure 3 shows a detailed sectional view on the line 3—3 of Figure 1, and

Figure 4 shows an enlarged detail side view of that portion of the conveyer belt through which the material may be discharged from between the upper and lower layers of the belt.

Referring to the accompanying drawings I have used the reference numeral 10 to indicate generally the main frame of the conveyer, and 11 the forward portion of the wagon box into which the conveyer discharges. At the front of the frame is a material cutting blade 12 and at the sides are the upright cutting blades 13. In use it is intended that the device be advanced and that the cutting blade be pushed into the earth or other material to be loaded, so that the material will slide up over the cutting blade to the conveyer in the rear thereof.

Mounted within the frame 10, below the rear end of the cutting blade 12 is a roller 14, and mounted on the frame 10, just above the forward end of the wagon box 11 is a large roller 15. This roller is made adjustable by the bolts 16 inserted through the slots 17. Midway between the rollers 14 and 15 are two smaller supporting rollers 18 and 19, rotatably mounted on the frame 10, the upper surface being in line with the upper surface of the end rollers.

At the sides of the said rollers are the stationary upright side boards 20. These side boards are arranged on lines slightly divergent from each other, from the front toward the rear as is clearly shown in Figure 2. The conveyer belt is indicated generally by the numeral 21 and is preferably made of rubber coated canvas belting material and is provided on its outer surface with a series of transverse cleats 22 at regular intervals.

The adjacent ends of the belt as clearly illustrated in Figures 2 and 4 stand apart a considerable distance and are connected by means of the flexible chains 23 and resting on top of said chains is a flexible flap 24 secured to the belt only at its advance edge. This flap is so arranged that during the upward movement of the conveyer it will rest upon the chains 23 and cover the space between the ends of the conveyer belt and during the return movement it will hang downwardly, thus providing an opening in the belt through which any material between the upper and lower layers of the belt may fall out.

In the event that any material should enter between the upper and lower layers of the belt and should adhere to the belt, I have provided for removing it by means of a stationary scraper 25, preferably made of flexible or yielding material and normally engaging the upper surface of the lower portion of the conveyer belt to hold any material until such time as the chains 23 come directly below said scraper 25, whereupon the material will be discharged through the space between the ends of the conveyer belt.

In addition to this I have provided for removing from the rollers any material that might adhere thereto by employing a stationary scraper blade 26 designed to normally stand close to the roller and scrape from the roller any material that accumulates thereon. These scrapers 26 are preferably made adjustable and the scraper 26 that is applied to the roller 15 is mounted upon the adjustable support of said roller so that it moves with the roller.

Mounted upon a stationary part of the frame 10 is a tension roller 27 supported yieldingly upon a spring 28. This tension roller is so positioned that substantially all of that part of the conveyer belt that is within the wagon box will be held against the roller 15 and thereby prevent the material that is piled up within the wagon box from entering between the bottom portions of the roller 15 and the adjacent portions of the conveyer belt and to also apply a yielding tension to the belt itself.

To prevent the entrance of material between the upper and lower portions of the conveyer belt during the upward travel of the material I have provided the inclined guards 29 fixed to a part of the frame 10, and having their inner ends extended under the upper portion of the conveyer belt and inclined downwardly and outwardly to a point beyond the outer edge of the lower portion of the conveyer belt as is shown clearly in Figure 3.

In practical use and assuming that the machine is being used to load, say for instance wet earth, the material is carried by the blade 12 to the receiving end of the conveyer belt in a continuous body with substantially the same width as the belt at the point where it is received upon the belt. Under such conditions the material will lightly rub against the sides 20 and prevent the accumulation of material thereon. As the material advances up the conveyer the shaking movement of the machine will cause the material to flatten out and become slightly wider so that it will lightly scour the divergent sides of the side boards 20. That is to say, there will be substantially no binding or retarding action on the material and yet the side boards will be scoured, due to the fact that the side boards diverge from each other toward the rear. In addition to this during the upward movement of the material, particles of the material may fall off, between the edges of the conveyer belt and the adjacent portions of the stationary side boards. This material, however, is all conducted by the guards 20 at a point of discharge that will prevent it from entering between the upper and lower parts of the conveyer belt. The material is then delivered into the wagon box and it obviously will accumulate therein and this accumulation of material in the wagon box would tend, under some circumstances to enter between the bottom portion of the roller 15 and the adjacent portion of the conveyer belt. To avoid this contingency I have provided a belt tightner roller 27, which is so positioned that it will hold the belt tightly to the roller 15 at the point where such accumulated material as is in the wagon box might tend to enter.

Furthermore, in the event that any material does enter between the upper and lower portions of the conveyer belt, this material will all be gathered together by the flexible scraper device for the conveyer belt and when the chains 23 come to position directly under this flexible scraper all of such accumulated material will be discharged. Material is prevented from adhering to the rollers themselves by means of the roller scrapers and all of the material thus scraped from the rollers will accumulate and drop by gravity to the upper surface of the low-portion of the conveyer so that it may drop out through the chains 23.

I claim as my invention:

1. In a device of the class described, the combination of a supporting frame, rollers therein, a conveyer belt passed around said rollers, stationary side boards supported by the frame, their sides being slightly spaced apart from the sides of the conveyer at the receiving end thereof and slightly divergent from each other toward the delivery end of the conveyer, for the purposes stated.

2. In a device of the class described, the combination of a supporting frame, rollers therein, a conveyer belt passed around said rollers, stationary side boards supported by the frame, their sides being slightly spaced apart from the sides of the conveyer at the receiving end thereof and slightly divergent from each other toward the delivery end of the conveyer and guards fixed to the frame between the upper and lower portions of the conveyer belt their upper edges being spaced inwardly from the side edges of the conveyer belt and their body portions being inclined downwardly and outwardly, for the purposes stated.

3. In a conveyer the combination, of a frame, a wagon box, a cutting blade at the forward end of the frame, a conveyer roller beneath the rear end of the cutting blade, a conveyer roller above the forward end of the wagon box, a flexible conveyer having cleats thereon passed around said rollers, stationary side boards at the sides of the upper portion of the conveyer belt slightly spaced apart from the edges of the conveyer belt at the receiving end, and slightly divergent from each other toward the delivery end, inclined guards having their upper ends spaced inwardly from the side edges of the conveyer and extended downwardly and outwardly to points beyond the sides of the lower portions of the conveyer, and a yielding tension roller applied to the under portion of the conveyer belt in positions to hold the conveyer belt against that portion of the conveyer roller that is within the wagon box for the purposes stated.

Des Moines, Iowa, May 23rd, 1921.

ROBERT SHEDENHELM.